United States Patent [19]

Cooper et al.

[11] 4,039,510

[45] Aug. 2, 1977

[54] REMOVAL OF CATALYST FROM POLYPHENYLENE OXIDE REACTION MIXTURES WITH NITROGENOUS SALTS OF NITRILOTRIACETIC ACID

[75] Inventors: Glenn Dale Cooper, Delmar; Daniel Edwin Floryan, Glenmont, both of N.Y.

[73] Assignee: General Electric Company, Pittsfield, Mass.

[21] Appl. No.: 638,804

[22] Filed: Dec. 8, 1975

[51] Int. Cl.² .................. C08G 65/44; C08G 65/46
[52] U.S. Cl. .................................. 260/47 ET
[58] Field of Search ........................ 260/47 ET

[56] References Cited

U.S. PATENT DOCUMENTS

| | | | |
|---|---|---|---|
| 3,365,422 | 1/1968 | Van Dort | 260/47 |
| 3,544,515 | 12/1970 | Katchman et al. | 260/47 |
| 3,733,301 | 5/1973 | Modan | 260/47 ET |
| 3,783,147 | 11/1974 | Calicchia et al. | 260/47 ET |
| 3,838,102 | 9/1974 | Bennett et al. | 260/47 ET |
| 3,951,917 | 4/1976 | Floryan et al. | 260/47 ET |

*Primary Examiner*—Lester L. Lee
*Attorney, Agent, or Firm*—William F. Mufatti; Edward A. Hedman; James V. Costigan

[57] ABSTRACT

A novel process is disclosed for the removal of catalyst residues from organic solutions of polyphenylene oxides. The process comprises adding a nitrogenous salt of nitrilotriacetic acid to a polyphenylene oxide reaction mixture and thereafter adding an antisolvent for polyphenylene oxide to the mixture to cause the polyphenylene oxide to precipitate.

10 Claims, No Drawings

REMOVAL OF CATALYST FROM POLYPHENYLENE OXIDE REACTION MIXTURES WITH NITROGENOUS SALTS OF NITRILOTRIACETIC ACID

This invention provides a novel process for the removal of catalyst residues from organic solutions of polyphenylene oxides by the use of amine salts of nitrilotriacetic acid. The nitrogenous salt of nitrilotriacetic acid is first added to the polyphenylene oxide reaction mixture and thereafter an antisolvent for the polyphenylene oxide is added to the mixture to cause the polyphenylene oxide to precipitate.

BACKGROUND OF THE INVENTION

The polyphenylene ethers and processes for their preparation are well known in the art. They are described in Hay, U.S. Pat. No. 3,306,874 and U.S. Pat. No. 3,306,875 and Blanchard et al., U.S. Pat. No. 3,219,625 and U.S. Pat. No. 3,219,626, all of which are incorporated by reference. Other patents which show the preparation of polyphenylene ethers include Price et al., U.S. Pat. No. 3,382,212; Kobayshi et al., U.S. Pat. No. 3,455,880; Bennet and Cooper, U.S. Pat. No. 3,796,689; Bennet and Katchman, U.S. Pat. No. 3,787,362; Cooper U.S. Pat. No. 3,733,307; Cooper and Bennett, U.S. Pat. No. 3,733,299 and Cooper and Bennett, U.S. Pat. No. 3,900,445, all of which are incorporated by reference.

The processes most generally used to produce the polyphenylene ethers involve the self-condensation of a monovalent phenol in the presence of an oxygen-containing gas and a catalyst comprising a metal-amine complex.

These reactions are usually carried out in the presence of an organic solvent and the reaction is ordinarily terminated by removal of the catalyst from the reaction mixture. In the prior art, this has been done by the use of aqueous solutions of acetic acid, sulfuric acid or chelating agents such as glycine, nitrilotriacetic acid or its sodium salts. The use of the sodium salts of nitrilotriacetic acid results in the formation of a copper-nitrilotriacetic acid complex which is not very soluble in the organic reaction mixture or in the antisolvent. Portions of this complex are carried over into the precipitated polyphenylene oxide when the antisolvent is added.

It has now been found that nitrogenous salts of nitrilotriacetic acid form complexes with copper that are retained in the organic reaction mixture when an antisolvent is added to precipitate the polyphenylene oxide resin. This results in a polyphenylene oxide having a decreased level of copper as the resulting nitrilotriacetic acid-copper complex is made soluble in the organic effluent on antisolvent precipitation of the polyphenylene oxide resin.

As used herein, the term nitrogenous salt is used to describe the amine salts and the substituted guanidine salts of the above-mentioned nitrilotriacetic acid.

DETAILED DESCRIPTION OF THE INVENTION

The invention provides in a process for forming a polyphenylene oxide by an oxidative coupling reaction in the presence of a complex copperamine catalyst comprising passing an oxygen-containing gas through an organic reaction solution of a phenol and said catalyst, the improvement which comprises separating the polyphenylene oxide from said organic reaction solution by contacting said reaction solution with a solution of a nitrogenous salt of nitrilotriacetic acid to form a mixed organic reaction solution which contains a small aqueous phase from the water formed in the polymerization reaction, and thereafter, adding to said mixed organic reaction solution an antisolvent for the polyphenylene oxide that causes said polyphenylene oxide to precipitate.

The preferred polyphenylene oxides are of the formula:

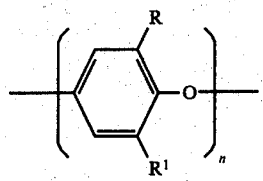

wherein the oxygen ether atom of one unit is connected to the benzene nucleus of the next adjoining unit, $n$ is an integer of at least 50; and R and $R^1$ are monovalent substituents selected from hydrogen, halogen, hydrocarbon radicals, halohydrocarbon radicals having at least two carbon atoms between the halogen atoms and the phenyl nucleus, hydrocarbonoxy and halohydrocarbonoxy radicals having at least two carbon atoms between the halogen atom and the phenyl nucleus.

The preferred material is poly(2,6-dimethyl-1,4-phenylene) oxide. Useful polymers of 2,6-dimethyl phenol include those having an intrinsic viscosity of about 0.5 in $CHCl_3$ at 30° C.

The nitrogenous salt of nitrilotriacetic acid may be an amine salt that is a reaction product of nitrilotriacetic acid and an amine of the formula:

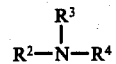

wherein $R^2$, $R^3$ and $R^4$ are independently selected from the group consisting of hydrogen, alkyl of 1–20 carbon atoms, cycloalkyl of 3–6 carbon atoms and alkenyl of 1–20 carbon atoms with the proviso that no more than any two of $R^2$, $R^3$ and $R^4$ may be hydrogen.

Preferred species of the amine salts of nitrilotriacetic acid include the di-butyl amine, n-hexylamine and n-octylamine salts.

The nitrogenous salt may also be the reaction product of nitrilotriacetic acid and a substituted guanidine compound of the formula:

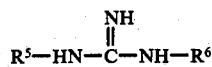

wherein $R^5$ and $R^6$ are independently selected from the group consisting of alkyl of 1–20 carbon atoms, aryl, alkaryl wherein the alkyl moiety has from 1–10 carbon atoms and aralkyl wherein the alkyl moiety has from 1–10 carbon atoms. The preferred members of this class of compounds are the mono and diphenyl substituted guanidines.

The polymerization of the phenolic monomer may be carried out by adding the phenolic monomer to a suitable reaction solvent and preferably a copper-amine catalyst. It is preferred to carry out the polymerization in the presence of a cupric salt-secondary amine catalyst such as cupric chloride and di-n-butylamine. These polymerizations are advantageously carried out in the presence of an inorganic alkali metal bromide or an alkaline earth metal bromide. The inorganic bromides may be used at a level of from 0.1 mole to 150 moles per 100 moles of phenolic monomer. These materials are described in U.S. Pat. No. 3,733,299.

Tetraalkylammonium salts may also be employed as promoters if desired. These materials are disclosed in copending application Ser. No. 485,741, which is hereby incorporated by reference.

The primary, secondary or tertiary amine component of the catalyst complex corresponds to those disclosed in the abovementioned Hay patents. Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl, i-propyl, n-butyl substituted amines, mono- and di-cyclohexylamine, ethylmethyl amine, morpholine, N-(lower)alkyl cycloaliphatic amines, such as N-methylcyclohexylamine, N,N'-dialkylethylenediamines, the N',N'-dialkylpropanediamines, the N,N,N'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used if desired. A preferred mono((-lower) alkyl amine is n-butyl amine; a preferred di(-lower) alkyl amine is di-n-butyl amine; and a preferred tri(lower) alkyl amine is triethyl amine. A preferred cyclic tertiary amine is pyridine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only 10 moles of tertiary amine, e.g., trimethyl amine or triethyl amine, per 100 moles of phenol need be used as a lower limit. Even smaller amounts of tertiary diamines, such as N,N,N',N'-tetramethyl-butanediamine can be used, down to as low as 0.2 mole per 100 moles of phenol.

Typical examples of cuprous salts and cupric salts suitable for the process are shown in the Hay patents. These will include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts are the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 0.2 to about 15 moles per 100 moles of the monovalent phenol.

The polymerization reaction is preferably performed in a solvent. Suitable solvents are disclosed in the above-noted Hay patents. Aromatic solvents such as benzene, toluene, xylene and o-dichlorobenzene are especially preferred, although tetrachloromethane, trichloromethane, dichloromethane, 1,2-dichloroethane and trichloroethylene may also be used.

The process for forming the polymer and the reaction conditions, such as temperature, oxygen, flow rate and the like are essentially the same as the conditions disclosed in the above-mentioned Hay patents, though reaction time to generate high-molecular weight polymer is reduced. The above-noted concentration ranges are preferred, though these ranges may vary to some extent depending upon oxygen flow rate, reaction temperature and the like.

The nitrogenous salt of nitrilotriacetic acid may be formed by the addition of a 1:1 to 20:1 mole ratio of nitrogenous base to nitrilotriacetic acid in accordance with procedures that are well known to those skilled in the art. It is desirable to neutralize all three of the acidic groups of the nitrilotriacetic acid, although this is not essential for the practice of the present invention. When the nitrogenous salt is added to the polyphenylene ether reaction mixture, it is convenient to add the nitrogenous salt of nitrilotriacetic acid to the polyphenylene oxide reaction mixture as an alcoholic dispersion. Usually, a mole ratio of 1:1 to 20:1 of nitrilotriacetic acid salt to the amount of copper in the polyphenylene oxide reaction mixture may be employed. Thereafter, the mixed organic reaction solution and aqueous coppercontaining extract is agitated and combined with an antisolvent for the polyphenylene oxide. The antisolvents are well known and may be selected from the lower alkanols of 1–10 carbon atoms, acetone and hexane. The preferred antisolvent is methanol.

After antisolvent precipitation, the polyphenylene oxide is filtered, reslurried with antisolvent and isolated in accordance with standard procedures.

DESCRIPTION OF THE PREFERRED EMBODIMENTS

The following examples illustrate different procedures that utilize the beneficial effects of the amine and guanidine salts of nitrilotriacetic acid.

EXAMPLE 1

Poly(2,6-dimethyl-1,4-phenylene oxide) was prepared by oxidizing 106 parts by weight 2,6-xylenol in 407 parts by weight toluene, containing 17 parts by weight di-n-butylamine, with $O_2$ gas, using a catalyst comprised of 0.44 parts by weight cupric chloride, .68 parts by weight sodium bromide and .1 parts by weight trioctyl-methylammonium chloride in 4.5 parts by weight methanol. (250:1:2 molar ratio of 2,6-xylenol-$CuCl_2$:NaBr). To 200 gm of the resulting polymer solution was added 14 gm of the di-n-butylamine salt of nitrilotriacetic acid in methanol, consisting of 3.6 g nitrilotriacetic acid, 6.5 gm of di-n-butylamine and 3.9g of methanol. (12:1 molar ratio of nitrilotriacetic acid to copper). The resulting two-phase mixture was stirred in a Waring blender 4 minutes, after which time 400ml of methanol was added to precipitate the poly(2,6-dimethyl-1,4-phenylene oxide). The polymer was filtered, washed with methanol and dried to give a product containing <5 ppm copper.

EXAMPLE 2

To 500 ml of a poly(2,6-dimethyl-1,4-phenylene oxide) solution prepared as in Example 1 was added 8.8 ml of the di-n-butylamine salt of nitrilotriacetic acid, containing 0.88g nitrilotriacetic acid and 1.78g di-n-butylamine, in methanol. (2:1 molar ratio nitrilotriacetic acid to copper). The resulting two-phase mixture was stirred gently for 25 minutes, after which the poly(2,6-dimethyl-1,4-phenylene oxide) was precipitated by the addition of 500 ml of methanol. The solid polymer was filtered and washed with methanol, then dried to give a product containing 56 ppm copper. By comparison, a polymer solution treated in the same manner with 2:1 molar ratio of the trisodium salt of nitrilotriacetic acid (in water) to copper resulted in a product containing 350 ppm copper. Without treatment of the polymer solution to remove copper a product containing 380-1000 ppm copper on precipitation with methanol normally results.

EXAMPLE 3

Several other triamine salts of nitrilotriacetic acid were evaluated for copper catalyst removal from organic solutions of poly(2,6-dimethyl-1,4-phenylene oxide), by the procedure outlined in the above examples. These experiments are summarized in the table below:

TABLE 1
COPPER CATALYST REMOVAL WITH AMINE SALTS OF NITROLOTRIACETIC ACID

| Amine | Mole Ratio NTA:Cu | Residual Copper (ppm) |
|---|---|---|
| n-hexylamine | 4:1 | 58 |
| n-octylamine | 4:1 | 42 |
| diphenylguanidine | 4:1 | 62 |

EXAMPLE 4

100 g of reaction mixture obtained by the procedure outlined in Example 1 was stirred for 5 minutes in a Waring blender with 7 ml of a 0.75 molar solution in methanol of the dibutylamine salt of nitrilotriacetic acid (3 moles DBA/mole NTA) and the polymer was precipitated with 170 ml of 90% acetone (9 volumes acetone:1 volume H$_2$O). The polymer was filtered off, reslurried with 50 ml of 90% acetone, and washed on the filter with a total of 200 ml of 90% acetone. The molar ratio of NTA:Cu was approximately 5.1:1; the copper content of the polymer was only 6 ppm. In a control experiment where the polymer was similarly isolated without previously contacting with the DBA-NTA salt the polymer contained 875 ppm of copper. In another similar experiment with the same amount of NTA added as a slurry in methanol rather than as the NTA-DBA salt, the copper content of the polymer was 190 ppm.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. In a process for forming a polyphenylene oxide by an oxidative coupling reaction in the presence of a complex copper-amine catalyst comprising passing an oxygen-containing gas through an organic reaction solution of a phenol and said catalyst, the improvement which comprises separating the polyphenylene oxide from said organic reaction solution by contacting said reaction solution with a solution of from 1:1 to 20:1 moles per mole of copper of a nitrogenous salt of nitrilotriacetic acid that is formed from nitrilotriacetic acid and an amine of the formula:

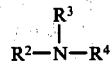

wherein R$^2$, R$^3$ and R$^4$ are independently selected from the group consisting of hydrogen, alkyl of 1-20 carbon atoms, cycloalkyl of 3-6 carbon atoms and alkenyl of 1-20 carbon atoms with the proviso that no more than any two of R$^2$, R$^3$ and R$^4$ may be hydrogen; or a compound of the formula:

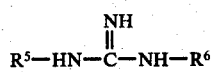

wherein R$^5$ and R$^6$ are independently selected from the group consisting of alkyl of 1-20 carbon atoms, aryl, alkaryl wherein the alkyl moiety has from 1-10 carbon atoms and aralkyl wherein the alkyl moiety has from 1-10 carbon atoms; to form a mixed organic reaction solution which contains a small aqueous phase from the water formed in the polymerization reaction, and thereafter, adding to said mixed organic reaction solution an antisolvent for the polyphenylene oxide that causes said polyphenylene oxide to precipitate.

2. A process as defined in claim 1 wherein said polyphenylene oxide is selected from the formula:

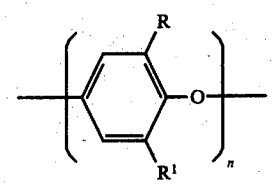

wherein the oxygen ether atom of one unit is connected to the benzene nucleus of the next adjoining unit, n is an integer of at least 50; and R and R$^1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

3. A process as defined in claim 2 wherein said polyphenylene oxide is poly(2,6-dimethyl-1,4-phenylene oxide).

4. A process as defined in claim 2 wherein said copperamine catalyst includes dibutyl amine.

5. A process as defined in claim 2 wherein the nitrogenous salt is an amine salt of nitrilotriacetic acid that is a reaction product of nitrilotriacetic acid and an amine of the formula:

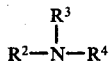

wherein $R^2$, $R^3$ and $R^4$ are independently selected from the group consisting of hydrogen, alkyl of 1-20 carbon atoms, cycloalkyl of 3-6 carbon atoms and alkenyl of 1-20 carbon atoms with the proviso that no more than any two of $R^2$, $R^3$ and $R^4$ may be hydrogen.

6. A process as defined in claim 2 wherein the nitrogenous salt is a reaction product of nitrilotriacetic acid and a compound of the formula:

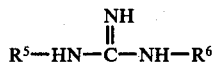

wherein $R^5$ and $R^6$ are independently selected from the group consisting of alkyl of 1-20 carbon atoms, aryl, alkaryl wherein the alkyl moiety has from 1-20 carbon atoms and aralkyl wherein the alkyl moiety has from 1-10 carbon atoms.

7. In a process for forming a poly(2,6-dimethyl-1,4 phenylene oxide) by an oxidative coupling reaction in the presence of a complex copper-amine catalyst comprising passing oxygen through an organic reaction solution of 2,6-xylenol and said catalyst, the improvement which comprises separating the poly (2,6-dimethyl -1,4 - phenylene oxide) by contacting said reaction solution with from 1:1 to 20:1 moles per mole of copper of a nitrogenous salt of nitrilotriacetic acid that is formed from nitrilotriacetic acid and an amine of the folmula:

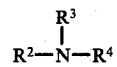

wherein $R^2$, $R^3$ and $R^4$ are independently selected from the group consisting of hydrogen, alkyl of 1-20 carbon atoms, cycloalkyl of 3-6 carbon atoms and alkenyl of 1-20 carbon atoms with the proviso that no more than any two of $R^2$, $R^3$ and $R^4$ may be hydrogen; to form a mixed organic reaction solution which contains a small aqueous phase from the water formed in the polymerization reaction, and thereafter, adding to said mixed organic reaction solution methanol which causes the poly (2,6-dimethyl -1,4-phenylene oxide) to precipitate.

8. A process as defined in claim 2 wherein the antisolvent is selected from lower alkanols of 1-10 carbon atoms, acetone and hexane.

9. A process as defined in claim 8 wherein the antisolvent is a lower alkanol of from 1-10 carbon atoms.

10. A process as defined in claim 2 wherein the antisolvent is methanol.

* * * * *